US012527658B2

(12) United States Patent
Schmitt et al.

(10) Patent No.: US 12,527,658 B2
(45) Date of Patent: Jan. 20, 2026

(54) ASSEMBLY FOR HANDLING A PLURALITY OF ANIMAL SEMEN PACKAGING STRAWS

(71) Applicant: IMV TECHNOLOGIES, Saint Ouen sur Iton (FR)

(72) Inventors: Eric Schmitt, Villaines-la-Juhel (FR); Jean-Louis Douesnel, Breteuil-sur-Iton (FR); Jean-Charles Gorges, Chenay (FR)

(73) Assignee: IMV TECHNOLOGIES, Saint Ouen sur Iton (FR)

( * ) Notice: Subject to any disclaimer, the term of this patent is extended or adjusted under 35 U.S.C. 154(b) by 994 days.

(21) Appl. No.: 17/640,034

(22) PCT Filed: Sep. 9, 2020

(86) PCT No.: PCT/EP2020/075227
§ 371 (c)(1),
(2) Date: Mar. 3, 2022

(87) PCT Pub. No.: WO2021/048224
PCT Pub. Date: Mar. 18, 2021

(65) Prior Publication Data
US 2022/0338969 A1    Oct. 27, 2022

(30) Foreign Application Priority Data

Sep. 9, 2019  (FR) ..................... 1909910

(51) Int. Cl.
*A61D 19/02*    (2006.01)
*A01N 1/02*    (2006.01)
(Continued)

(52) U.S. Cl.
CPC ........... *A61D 19/024* (2013.01); *A01N 1/147* (2025.01); *B65D 25/108* (2013.01)

(58) Field of Classification Search
CPC .. B65D 25/108; A61D 19/024; A61D 19/022; A61D 19/025; A61D 99/00;
(Continued)

(56) References Cited

U.S. PATENT DOCUMENTS 7,252,988 B2 *   8/2007  Saint-Ramon ....... A46B 11/001
                                                    73/864.03
2011/0318818 A1 *  12/2011  Beau .................... A61D 19/024
                                                    435/284.1
(Continued)

FOREIGN PATENT DOCUMENTS

EP      2450648 A2      5/2012
JP      05285163 A  *  11/1993
JP      3202181 U       1/2016

*Primary Examiner* — Frantz F Jules
*Assistant Examiner* — Martha Tadesse
(74) *Attorney, Agent, or Firm* — FisherBroyles, LLP; Roger L. Browdy; James E. Mrose

(57) ABSTRACT

The assembly comprises a ramp (4) and a straw transfer device (60) comprising two lateral pads and a straw (1) collector arranged between the two lateral pads, the freezer ramp (4) and the transfer device (60) being configured to allow a first end position, to allow a second end position, and such that, by sliding the transfer device (60) from the first end position to the second end position with the pads that slide on angled sections (19) of the ramp (4), the plurality of straws (1) initially arranged on the ramp (4) is recovered in the collector of the transfer device (60).

10 Claims, 15 Drawing Sheets

(51) Int. Cl.
*A01N 1/147* (2025.01)
*B65D 25/10* (2006.01)

(58) Field of Classification Search
CPC ........ A01N 1/145; A01N 1/147; A01N 1/142; G01K 11/06
See application file for complete search history.

(56) References Cited

U.S. PATENT DOCUMENTS

| | | | | |
|---|---|---|---|---|
| 2018/0092723 | A1* | 4/2018 | Schmitt | A61D 19/025 |
| 2019/0358011 | A1* | 11/2019 | Schmitt | A61B 10/0058 |
| 2020/0383321 | A1* | 12/2020 | Schmitt | A61D 19/024 |
| 2022/0322657 | A1* | 10/2022 | Schmitt | A61D 19/022 |
| 2022/0322659 | A1* | 10/2022 | Schmitt | A01N 1/147 |

* cited by examiner

[Fig. 1]
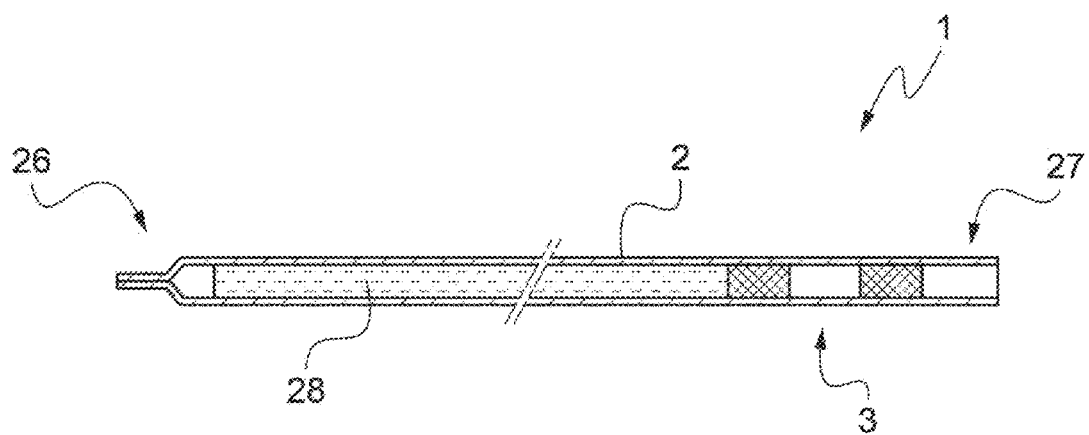
[Fig. 2]
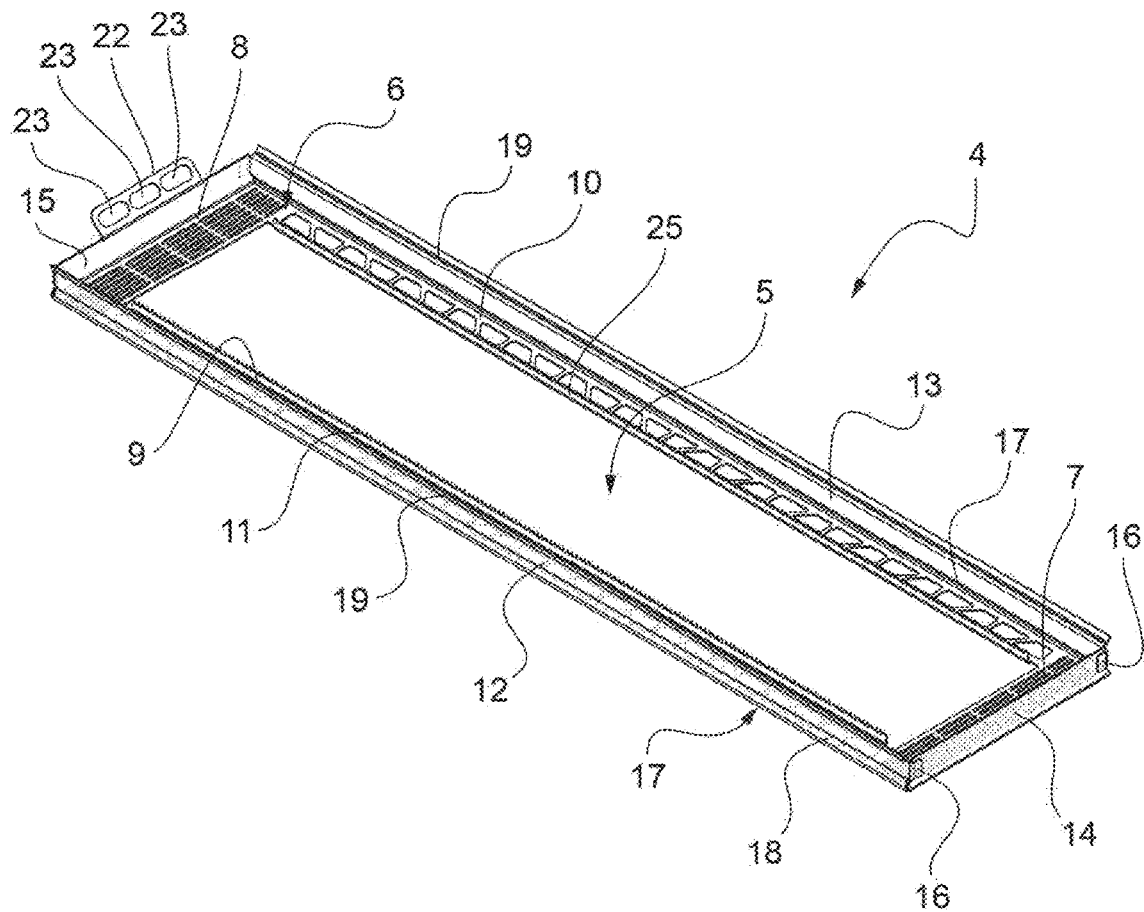

[Fig. 3]
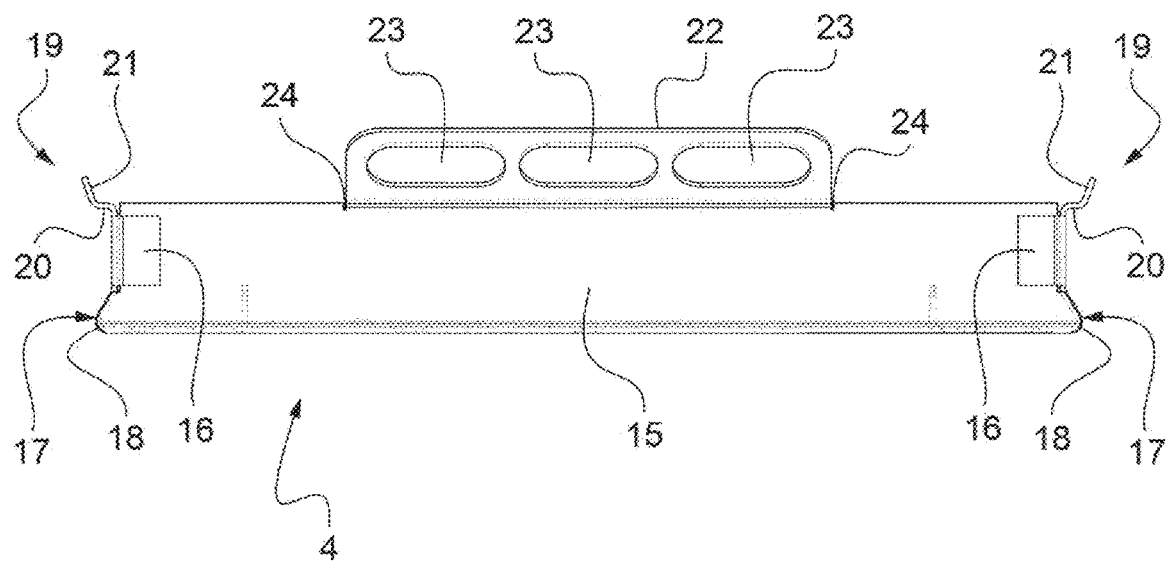
[Fig. 4]
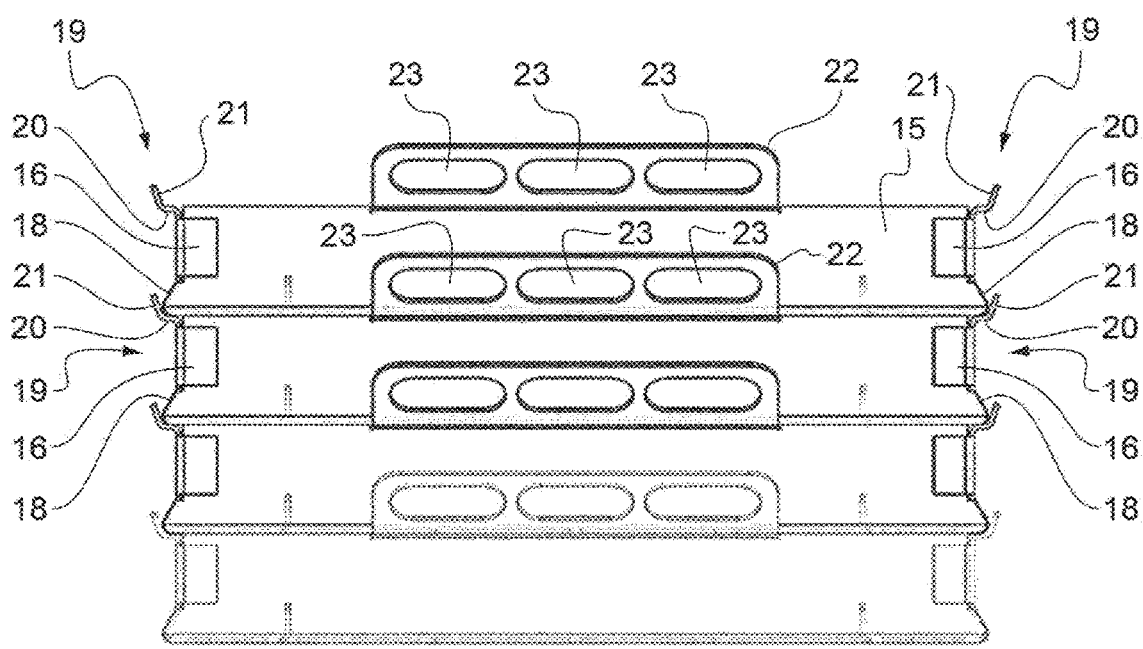

[Fig. 7]
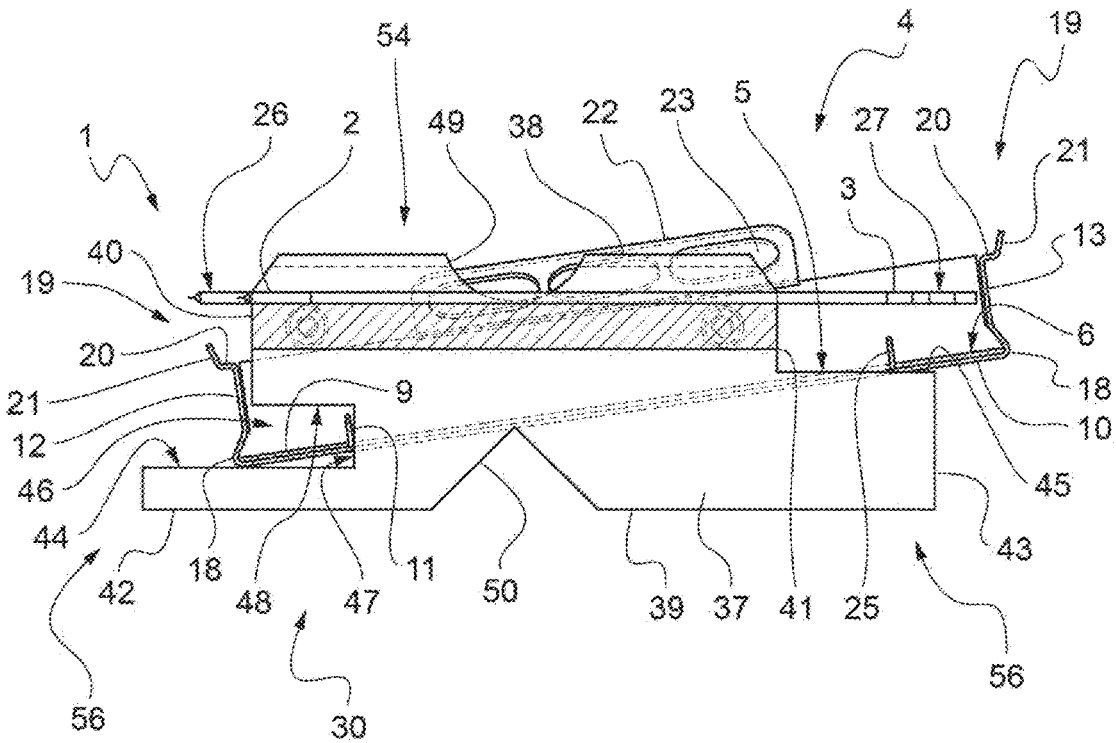
[Fig. 8]
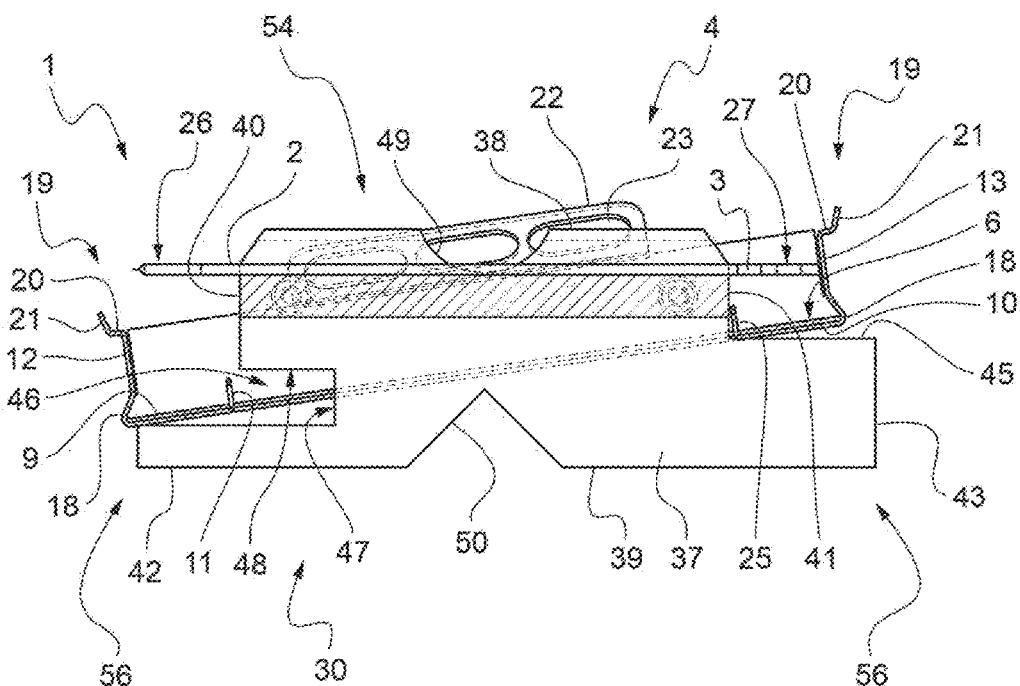

[Fig. 11]
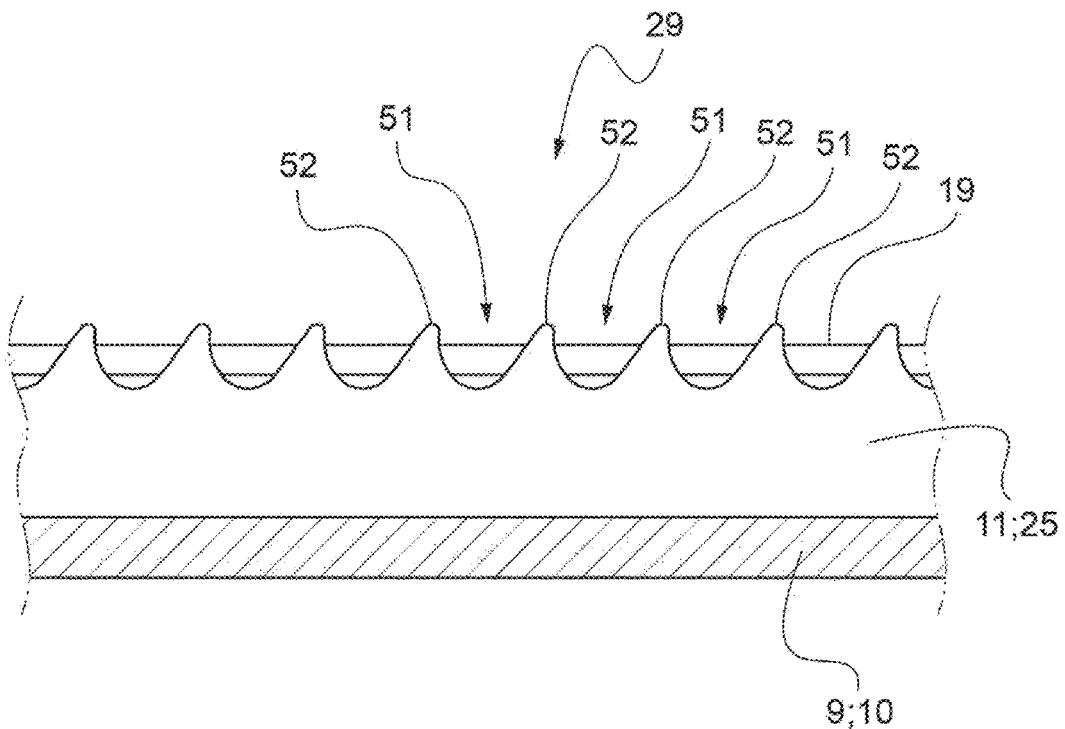
[Fig. 12]
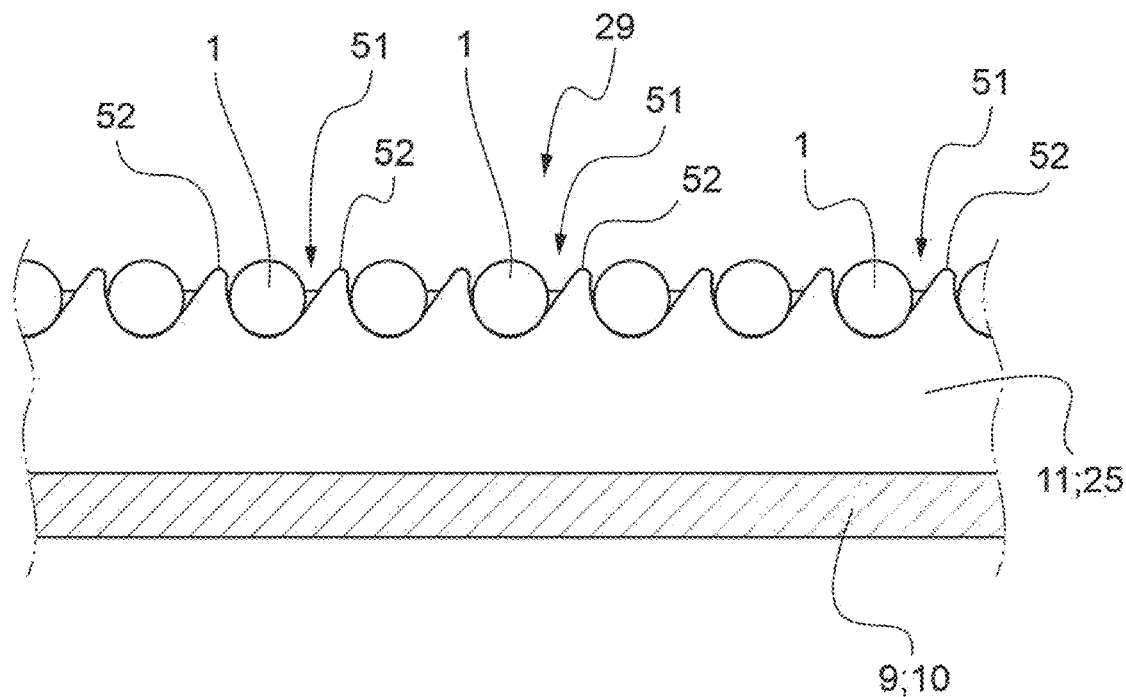

[Fig. 13]
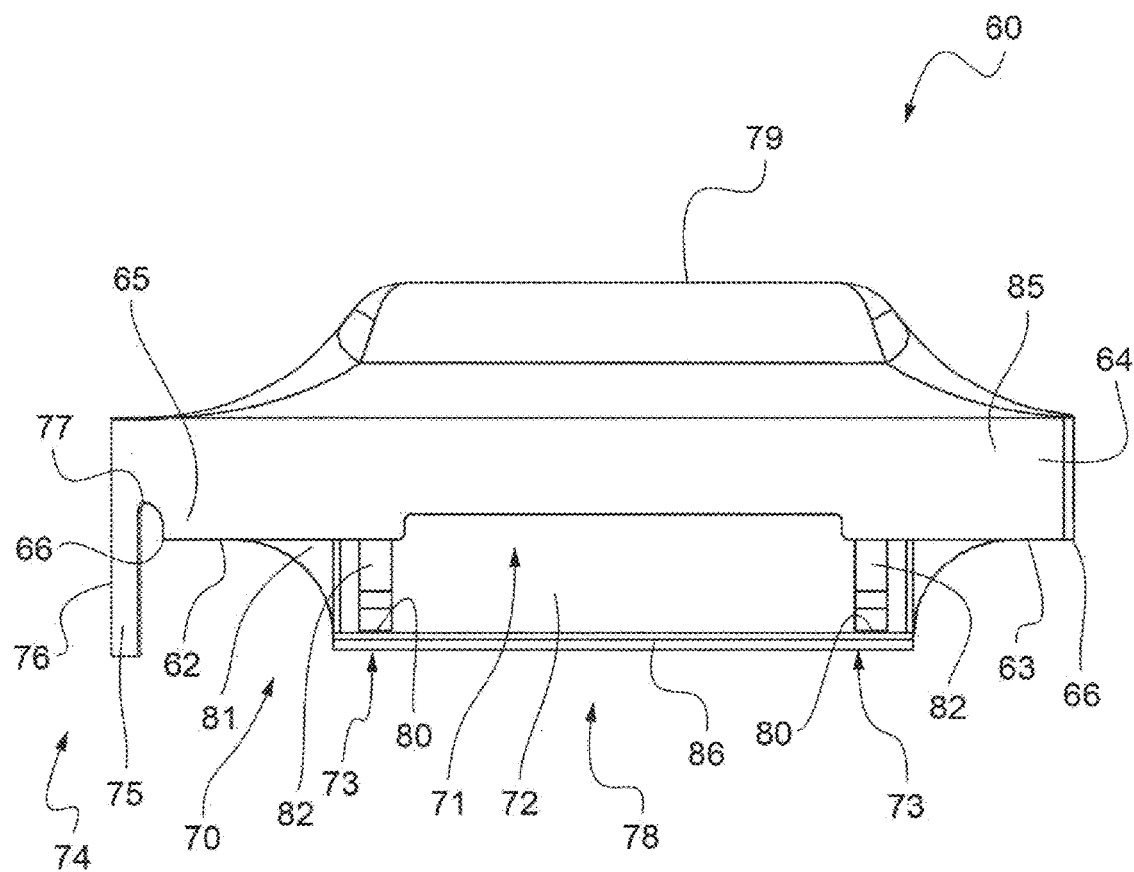

[Fig. 15]
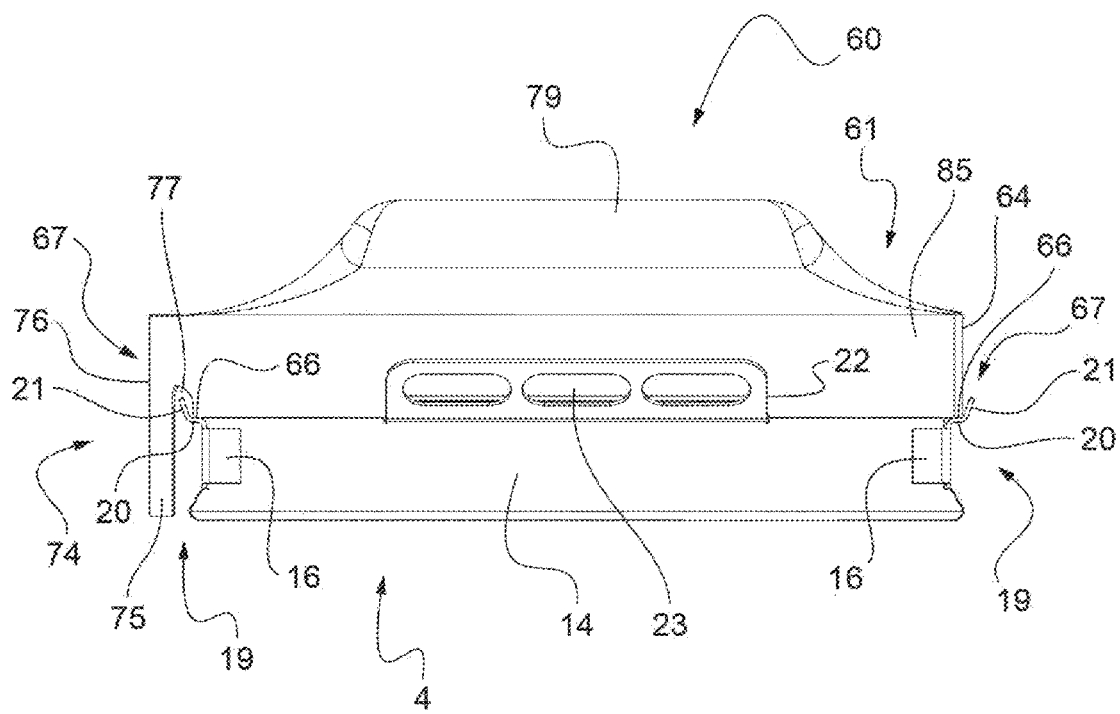
[Fig. 16]
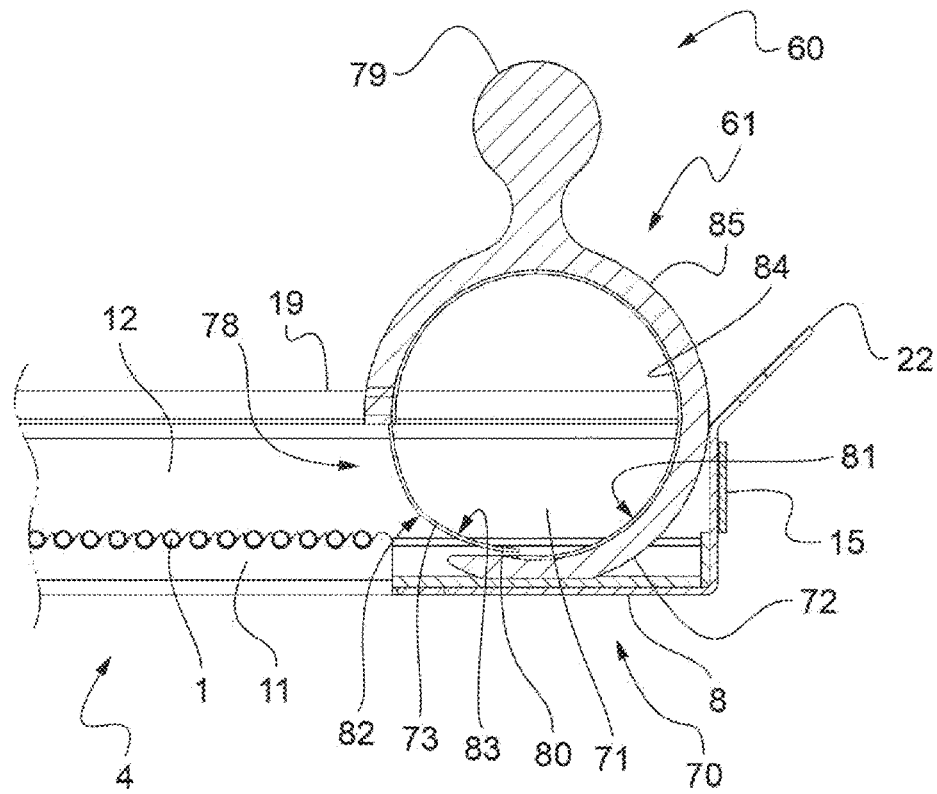

[Fig. 17]
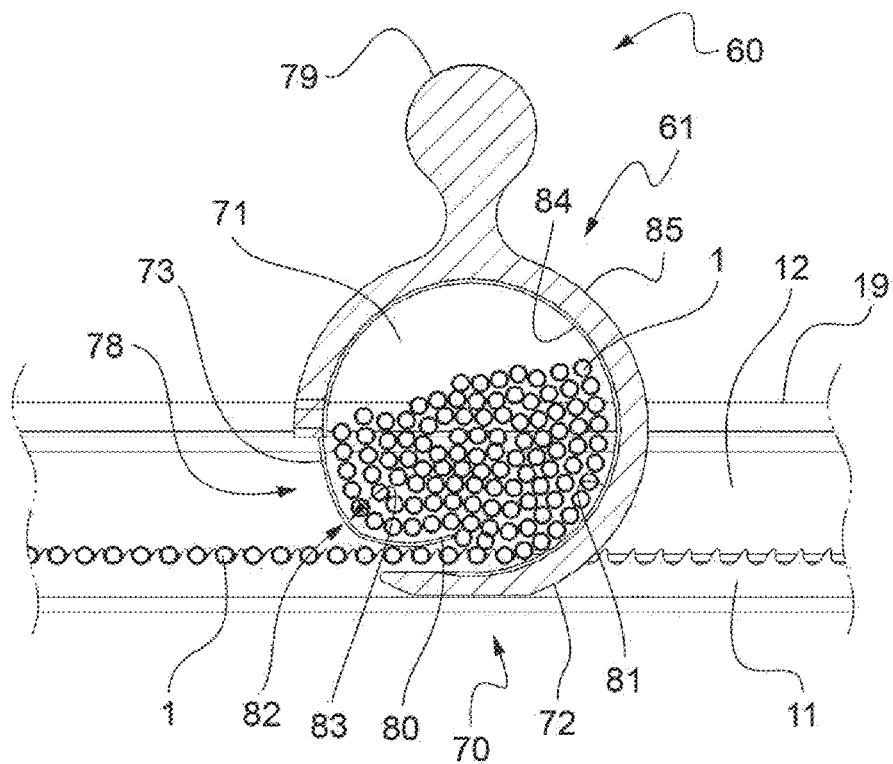
[Fig. 18]
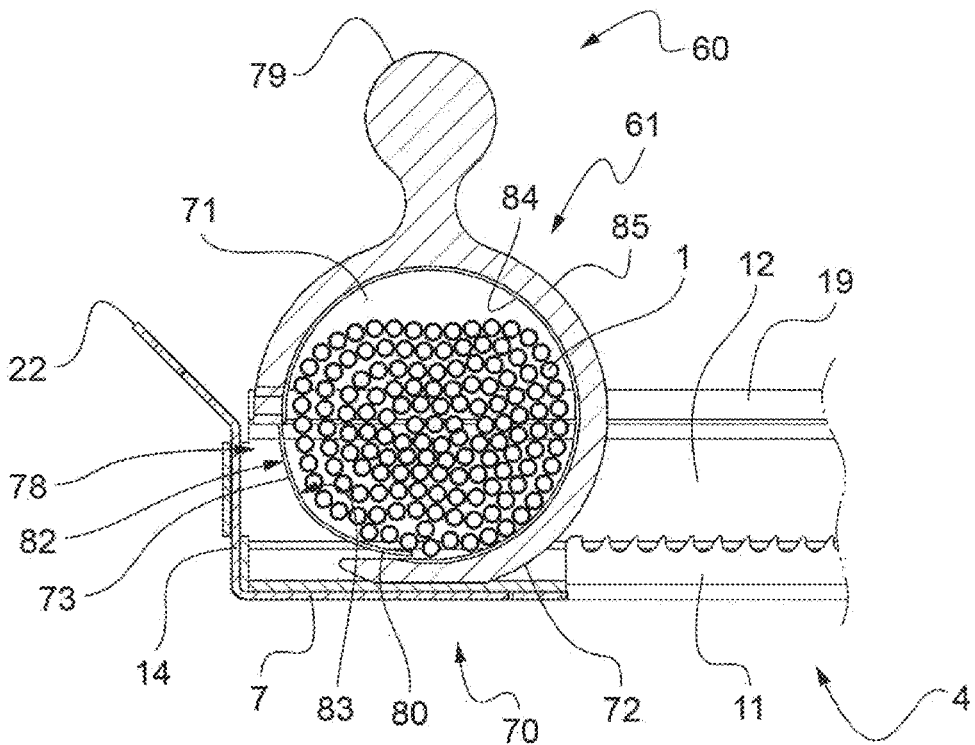

[Fig. 20]
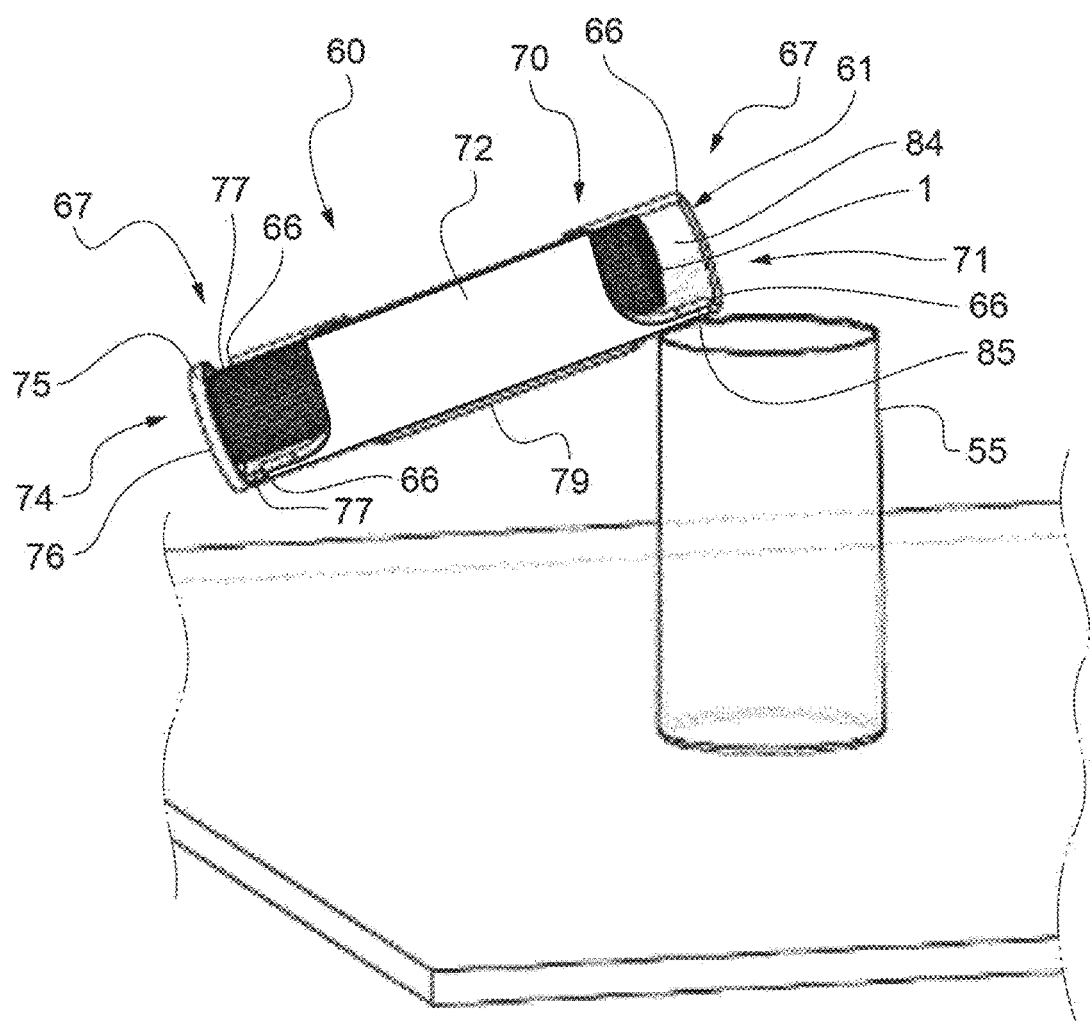

[Fig. 21]
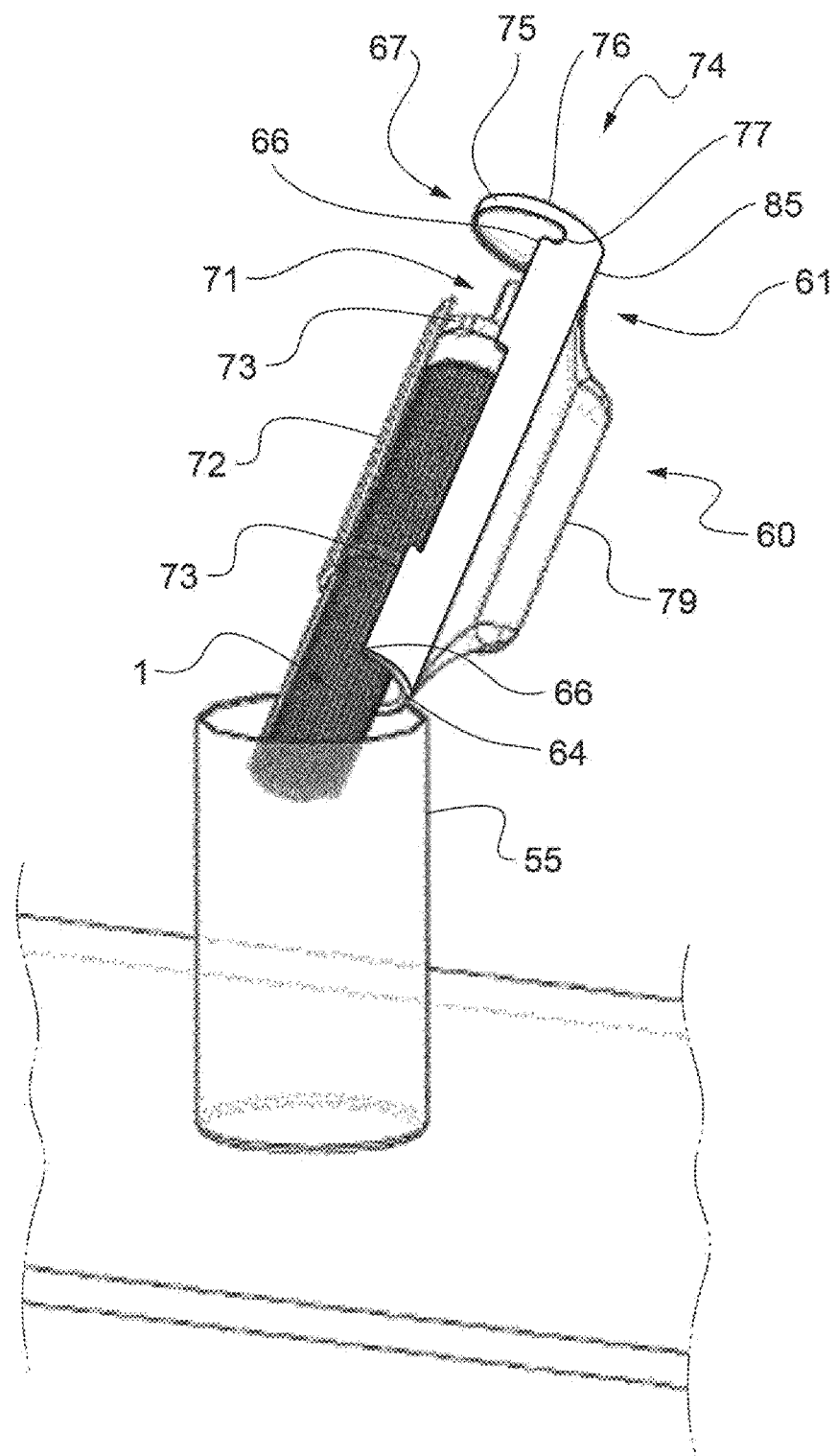

ASSEMBLY FOR HANDLING A PLURALITY OF ANIMAL SEMEN PACKAGING STRAWS

TECHNICAL FIELD OF THE INVENTION

The invention concerns the preservation of animal semen

STATE OF THE ART

It is known that for certain animal species, for example in particular bovine and equine livestock, semen is treated after collection by diluting that then the diluted semen is subdivided into doses each filling a straw formed by a thin tube of plastic material and by a stopper engaged in that tube, the dose of semen being disposed between the stopper and the end of the tube furthest from the stopper, the corresponding end section being closed off after filling by crushing and welding.

The preservation of the doses of semen contained in the straws is carried out by immersion of the straws in a bath of liquid nitrogen.

Prior to that immersion, the straws are frozen by being placed in a freezer in which passes a stream of liquid nitrogen vapor.

In practice, to freeze the straws a plurality is disposed on a rack referred to as freezing rack then the freezing rack carrying the straws is placed in the freezer. In general, the freezer is dimensioned to receive several freezing racks superposed.

Such a freezing rack is already known that comprises two toothed walls extending along a free central space, each toothed wall having a set of toothing at its apex, the sets of toothing of the toothed walls being identical with each hollow delimited by a surface having a curvature according to the diameter of the straws.

In order to assist the operator to dispose the straws on the freezing rack, a support member is already known, in general called a gauge, which comprises a plate and two flanges rigidly connected to the plate, which plate has a width less than the length of the straws and comprises a fluted surface having a plurality of channels each of which is similar and oriented in the direction of the width of the plate and each delimited by a surface having a curvature according to the diameter of the straws, the channels being disposed side by side with the same pitch as the sets of toothing of the freezing rack. The support member and the freezing rack are configured such that the support member can be inserted into the central free space of the freezing rack. The flanges are configured such that the support member can be placed on the horizontal reception surface with the fluted surface located atop the plate at a predetermined level above the reception surface. Each flange comprises a central part as well as a first projecting part and a second projecting part each extending on one side of the central part, these projecting parts being provided to receive the base of the freezing rack of which the sets of toothing are then under the fluted surface.

In this position, the operator places the straws in disorder on the fluted surface and spreads them thereon in order for each straw to be accommodated in one of the channels.

As the plate has a width less than the length of the straws, the operator can arrange the straws such that each has an end section that projects from said plate on each side.

The freezing rack is then raised and collects the straws of which each then has on each side an end section received in a hollow of one of the sets of toothing.

DISCLOSURE OF THE INVENTION

The invention is directed to enabling an operator to perform the manipulations of the straws in a simple, convenient and economical manner.

To that end, the invention provides an assembly for manipulating a plurality of straws for packaging animal semen each having a predetermined diameter and a predetermined length, comprising a freezing rack having a rim and a bottom surrounding a central free space, said bottom comprising two toothed walls which extend longitudinally along said central space, each toothed wall having a set of toothing at its apex comprising a succession of teeth and hollows, the sets of toothing of said toothed walls being identical with each hollow delimited by a surface having a curvature according to said predetermined diameter; characterized in that in said freezing rack said bottom comprises a bottom wall in the form of a rectangular frame surrounding the central free space with two transverse sections and two longitudinal sections, said toothed walls extending transversely to the bottom wall and internally bordering said longitudinal sections, said rim extending transversely to the bottom wall and comprising two longitudinal walls externally bordering said longitudinal sections of the bottom wall and two transverse walls externally bordering said transverse sections of the bottom wall, said longitudinal walls each comprising at their apex a gutter portion;

said assembly further comprises a transfer device for straws comprising two lateral skids and a collector for straws that is disposed between the two lateral skids, said freezing rack and said transfer device being configured to have a first extreme position in which said transfer device is disposed with each lateral skid bearing on a said gutter portion while said collector is located over a said transverse section of said bottom wall, to have a second extreme position in which said transfer device is disposed with each lateral skid bearing on a said gutter portion while said collector is located over the other said transverse section of said bottom wall, and such that by sliding the transfer device from the first extreme position to the second extreme position with said skids sliding on said gutter portions, said plurality of straws initially disposed on said rack is collected in said collector of said transfer device.

Thus, the straws can be particularly easily picked up from the freezing rack, since it suffices to place the transfer device comprised by the assembly according to the invention on the rack comprised by the assembly according to the invention, and more particularly on one of the transverse sections of its bottom wall then to slide the transfer device along the rack, in relation to which it is guided by virtue of the cooperation of its skids with the gutter portions of the rack.

In addition to the convenience of manipulation of the straws given by the assembly according to the invention, the assembly has the advantage of avoiding the direct contact of the frozen straws with the operator's hand or with the glove that covers them, which avoids or in any case considerably limits the risk of thermal shock to the straws and/or to the operator's hand.

According to advantageous features:

said collector delimits an accommodation opening over its entire length by a mouth, which mouth is oriented towards said toothed walls in said first extreme position, said freezing rack and said transfer device are configured such that when the transfer device is disposed with each lateral skid bearing on a said gutter portion, the surface forming the lower limit of the mouth is at a level located between said transverse sections of the bottom wall and the bottom of the hollow of the toothed walls;

said accommodation is of round cross-section;

the transfer device comprises a body of inverted channel shape and a curved scoop projecting from a base of said body, said mouth being located between a distal end of the scoop and a longitudinal edge surface of the body;

the transfer device for straws comprises a body of inverted channel shape having two end portions located longitudinally on opposite sides of said collector, each said end portion having two bases of wedge shape, each said skid being formed by said two bases of wedge shape of a respective one of said end portions;

each gutter portion comprises a wing extending transversely to the longitudinal walls and an inclined wing extending from said wing outwardly and towards the top of said freezing rack;

said collector delimits an accommodation opening over its whole length by a mouth, which mouth is oriented towards said toothed walls in said first extreme position; and the transfer device comprises non-return members disposed in said mouth, which are configured to let the straws enter the accommodation through said mouth and to prevent the straws from coming out therefrom through said mouth;

said non-return members are blades configured to bend in order to allow the straws to enter the accommodation through said mouth and to come into stopped engagement against a wall to prevent the straws coming out therefrom through said mouth;

said collector delimits an accommodation opening over its whole length by a mouth, which mouth is oriented towards said toothed walls in said first extreme position; the transfer device comprises a flange closing said accommodation at one end of said transfer device, said accommodation being open at the other end of the transfer device; and/or the assembly further comprises a cup for storing the straws, said collector of the transfer device delimiting an accommodation of round section open at one end of the transfer device, said cup having an opening having a section in which is accommodated the section of said accommodation.

BRIEF DESCRIPTION OF THE DRAWINGS

The disclosure of the invention will now be continued with the detailed description of embodiments, given below by way of illustrative and non-limiting example, with reference to the accompanying drawings, in which:

FIG. 1 is a view in longitudinal cross-section of a conventional straw that is filled and closed off;

FIG. 2 is a perspective view of a freezing rack provided to receive a plurality of straws such as illustrated in FIG. 1 and then to be placed in a freezer;

FIG. 3 is a front view of that freezing rack;

FIG. 4 is a similar view to FIG. 3 but showing several similar freezing racks stacked on top of each other;

FIG. 7 is a cross-section view in elevation of the freezing rack and of the support member in the same position as in FIG. 6 after the straws have been put in place on the plate of the support member;

FIG. 8 is a similar view to FIG. 7 but with the freezing rack and the support member in a relative position of longitudinal alignment of the straws put in place on the plate of the support member;

FIG. 11 is a cross-section view in elevation of a portion of the freezing rack before the straws have been put in place;

FIG. 12 is a similar view to FIG. 11 but with the straws put in place;

FIG. 13 is a view in elevation of a transfer device for collection, after freezing, of the straws disposed on the rack;

FIG. 15 is an elevation view similar to FIG. 13 but with the transfer device placed on the freezing rack as shown in FIG. 14;

FIG. 16 is a cross-section view in elevation of the transfer device and of the freezing rack in the same position as in FIG. 14;

FIG. 17 is a similar view to FIG. 16 but with the transfer device in an intermediate position on the freezing rack and some of the straws which have been collected by the transfer device;

FIG. 18 is a similar view to FIGS. 16 and 17 but with the transfer device in a second extreme position and all the straws collected by the transfer device;

FIG. 20 is a perspective view of the transfer device filled with straws and of a cup, the transfer device being in a position of tipping towards the inside of the cup; and FIG. 21 is a similar view to FIG. 20 but with the transfer device in an overturned position above the cup tipping the straws inside the cup.

DETAILED DESCRIPTION

Figure 5:
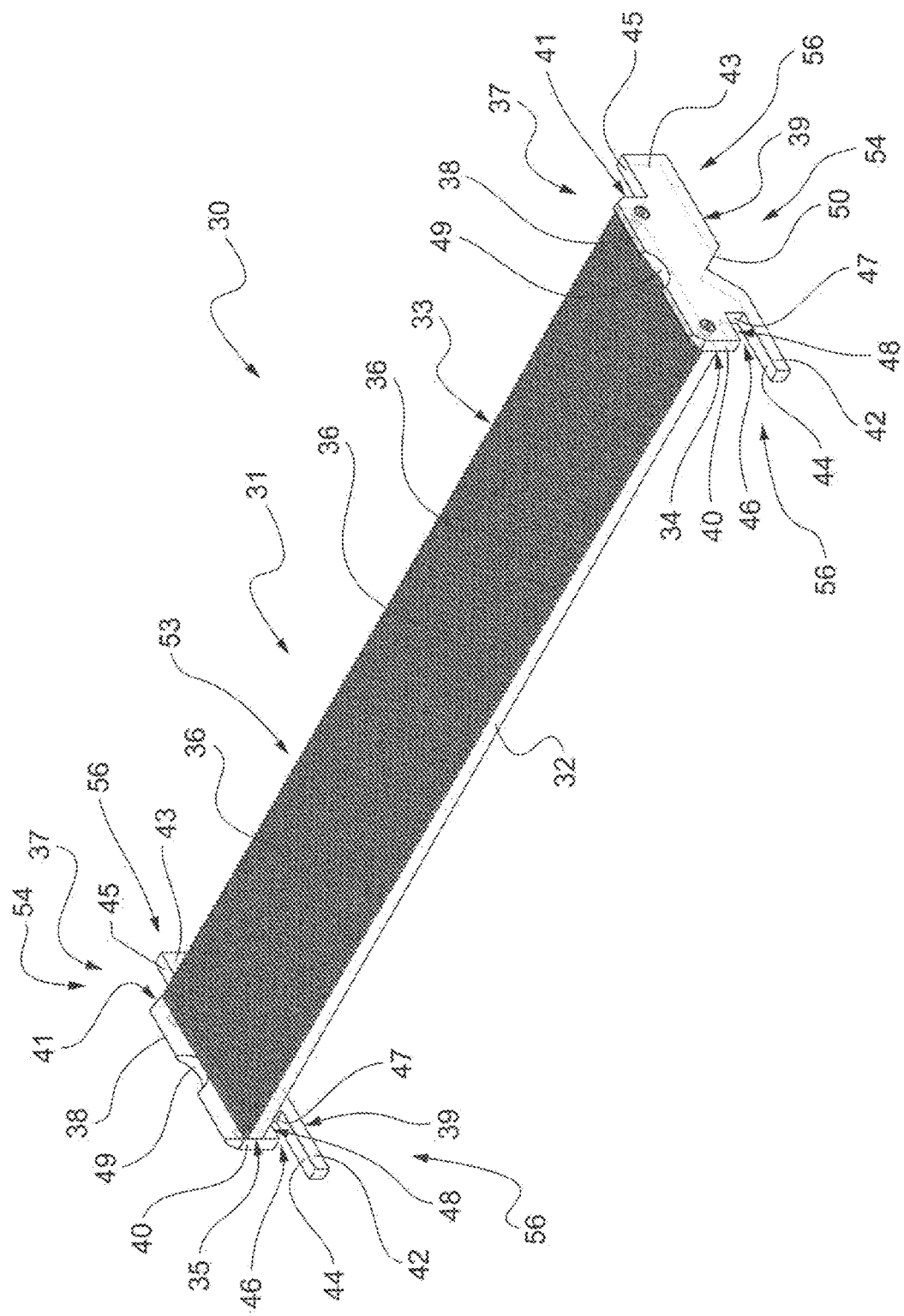
FIG. 5 is a perspective view of a support member provided to facilitate the putting of the straws in place on the freezing rack shown in FIGS. 2 and 3.

FIG. 1 shows, in the filled and closed-off state, a packaging straw 1 for animal semen formed by a thin tube 2 of plastic material and by a stopper 3 engaged in the tube 2, the straw 1 containing a dose 28 of diluted animal semen, here bull semen, disposed between the stopper 3 and an end section 26 closed off by crushing and welding.

The end section 26 is the furthest from the stopper 3. The end section 27, which is the closest to the stopper, is not closed off here (from this side, it is the stopper 3 which retains the dose 28 of semen).

The straw 1, and more specifically the tube 2, has a length of the order of 133 mm and an inside diameter which is of the order of 1.6 mm with a wall thickness of the order of 0.175 mm such that the diameter of the straw 1, and more specifically the outside diameter of the tube 2, is of the order of 1.95 mm.

In practice, given the manufacturing tolerances, the outside diameter of the tube 2 of the straw 1 is comprised between 1.90 and 2 mm and its length is comprised between 132 and 134 mm.

The dose of semen 28 contained in the straw 1 is a dose of fresh semen the preservation of which is provided by immersion of the straw 1 in a bath of liquid nitrogen.

Prior to that immersion, the straws are to be frozen by being placed in a freezer in which passes a stream of liquid nitrogen vapor.

In practice, a plurality of straws 1 is disposed on a rack referred to as freezing rack then the freezing rack carrying the straws is placed in the freezer. In general, the freezer is dimensioned to receive several freezing racks superposed.

FIGS. 2 to 4 show a freezing rack specially designed to cooperate with accessories provided to facilitate the manipulation of the straws.

Here, the freezing rack 4 is made from metal sheet cut out and bent.

The freezing rack 4 has the general form of a plate having a rim and a bottom surrounding a central free space 5.

The bottom comprises a bottom wall 6 in the form of a rectangular frame surrounding the central free space 5. The bottom wall 6 is apertured so as to enable the passage of liquid nitrogen vapor in the freezer.

The bottom wall 6 comprises two transverse sections 7 and 8 and two longitudinal sections 9 and 10. The transverse sections 7, 8 are opposite each other and connect the longitudinal sections 9, 10 which are opposite each other.

In the bottom of the freezing rack 4, the longitudinal sections 9, 10 are each bordered internally by a toothed wall 11, 25 extending transversely of the bottom wall 6.

The apex of each of the toothed walls 11, 25 has a set of toothing 29 comprising a succession of teeth 52 and hollows 51, each hollow 51 being configured to accommodate an end section 26, 27 of a straw 1, as illustrated in FIGS. 11 and 12.

Each hollow 51 of the set of toothing 29 of the toothed wall 11 is opposite a hollow 51 of the set of toothing 29 of the toothed wall 25 and each hollow 51 is delimited by a surface having a curvature according to the diameter of the straws. The pitch of the set of toothing 29 of the toothed wall 11 is identical to the pitch of the set of toothing 29 of the toothed wall 25.

Thus, each hollow 51 of the set of toothing 29 of the toothed wall 11 makes it possible to accommodate an end section 26 and each hollow 51 opposite the toothed wall 25 makes it possible to accommodate an end section 27.

The rim of the freezing rack 4 comprises two longitudinal walls 12, 13 disposed opposite each other, connected by two transverse walls 14 and 15 opposite each other. The transverse walls 14, 15 extend from the transverse sections 7, 8 of the bottom wall 6 and the longitudinal walls 12 and 13 extend from the longitudinal sections 9 and 10 of the bottom wall 6.

The transverse walls 14, 15 and the longitudinal walls 12, 13 extend transversely to the bottom wall 6 of the freezing rack 4.

Furthermore, a wall portion 16 projects at opposite ends of each of the longitudinal walls 12, 13. These wall portions 16 are folded towards the transverse walls 14, 15, then welded to those walls, in order to hold them in position the longitudinal walls 12, 13 against the transverse walls 14, 15 making it possible thereby to stiffen the freezing rack 4.

As case be clearly seen in FIG. 3, the base 17 of the longitudinal walls 13, 14, connected to the longitudinal sections 9, 10, forms a protuberance 18.

A gutter portion 19 projects from each longitudinal wall 12, 13. Each gutter portion 19 comprises a wing 20 extending transversely to the longitudinal walls 12, 13 as well as an inclined wing 21 extending from the wing 20 outwardly and towards the top of the freezing rack 4.

The freezing rack 4 is stackable with another similar freezing rack, as is illustrated in FIG. 4. Each protuberance 18 of a freezing rack disposed above another freezing rack is then accommodated in the corresponding gutter portion 19 of the other freezing rack disposed below.

More specifically, each protuberance 18 of the freezing rack bears on the wing 20 of the freezing rack below and comes to bear against the wing 21.

When several freezing racks 4 are stacked, the gutter portions 19 of one rack provide the lateral holding of the rack disposed above.

Furthermore, the freezing rack 4 is provided with two grasping feet 22 each emerging from a wall 14, 15, outwardly and towards the top of the freezing rack 4. The grasping feet 22 are each provided with holes 23 enabling the user to manipulate the freezing rack 4 while limiting the risk of the fingers sliding relative to the feet 22.

Each grasping lug 22 is disposed equidistant from the longitudinal walls 12, 13.

When stacking one freezing rack 4 on another similar freezing rack, each grasping lug 22 of the rack below holds the rack above in the longitudinal direction.

Furthermore, slots 24 are provided in the transverse walls 14, 15 at opposite ends of each of the grasping feet 22.

As indicated above, the freezing rack 4 has been specially designed to cooperate with accessories provided to facilitate the manipulation of the straws.

A description will now be given of an accessory to facilitate the putting in place of the plurality of straws 1 on the freezing rack 4, this being a support member 30 shown in FIG. 5.

The support member 30 is configured to be laid on a horizontal reception surface for example such as a table.

The support member 30 has a plate 31 and two flanges 37.

The plate 31 is of rectangular contour. It is delimited by two longitudinal faces 32, 33, two transverse faces 34, 35, an upper face and a lower face.

The upper face of the plate 31 forms a fluted surface 53 having a plurality of similar channels 36 provided side by side at a predetermined pitch.

Each channel 36 is configured to receive one straw 1 due to the fact that it is delimited by a surface having a curvature according to the diameter of a straw 1.

Each channel 36 is oriented in the direction of the width of the plate 31, that is to say in the transverse direction.

The channels 36 are disposed over the whole width of the upper face of the plate 31, that is to say from the longitudinal face 32 to the longitudinal face 33.

In the illustrated example, the plate 31 comprises one hundred and seventy-five channels 6 and can thus receive one hundred and seventy-five straws 1.

Broadly speaking, it is advantageous for the plate 31 to comprise between seventy and two hundred and five similar channels configured to accommodate that same number of straws 1.

The plate 31 has a width less than the length of the straws 1, i.e. 133 mm, such that when a straw 1 is placed centered or approximately centered in a channel 36, its end sections 26 and 27 jut on opposite sides for the plate 31.

Broadly speaking, it is advantageous for the plate 31 to have a width comprised between 80 and 90 mm.

The flanges 37 of the support member 30 are identical.

They are rigidly connected to the plate 31, here at each transverse end. The rigid connection is made here by screwing.

Each flange 37 comprises a central part 54 and two projecting parts 56.

The central part 54 is of rectangular general shape and is delimited by an upper surface 38, a lower surface 39 and two lateral surfaces 40 and 41.

The width of this central part 54, that is to say the distance between the two lateral surfaces 40, 41 constitutes the width of the plate 31.

The lower surface 39 of each of the flanges 37 bears on the reception surface like a table. The fastening of each of the flanges 37 on the plate 31 is made in the neighborhood of the upper surface 38 of each flange 37.

Thus, the plate 31 extends above and parallel to the horizontal reception surface on which rest the flanges 37 of the support member 30.

The plate 31 and the central part 54 of each of the flanges 37 are configured to be accommodated in the central free space 5 of the freezing rack 4, between the toothed walls 11 and 25. The projecting parts 56 extend at opposite ends of the central part 54 of the flanges 37. More specifically, each projecting part 56 emerges from one of the lateral surfaces 40, 41.

The first projecting part 56 comprises a foot 42 jutting from the lateral surface 40 at the base of the flange 37, with the lower face of the foot 42 here forming part of the lower surface 39 of the flange 37.

Figure 6:
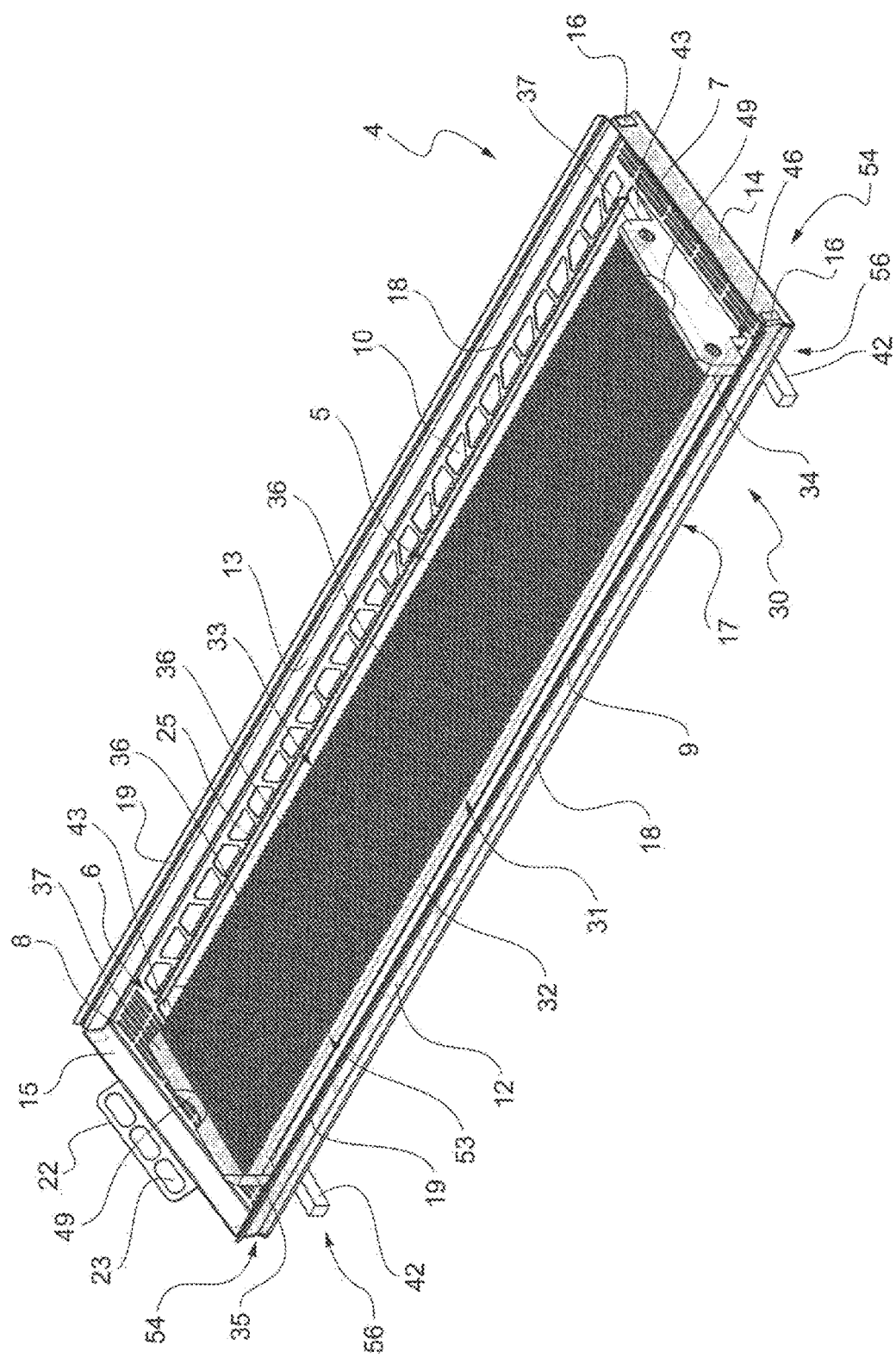
FIG. 6 is a perspective view of the support member and of the freezing rack in a relative position of putting straws in place on the plate of the support member.

The upper face of the foot 42 forms a bearing face 44 provided to receive one of the zones of the freezing rack 4 located at the junction of the bottom wall 6 and of the rim, in this case the protuberance 18 opposite the toothed wall 11, as can be seen in FIGS. 6 to 8.

The second projecting part 56 comprises a foot 43 jutting from the lateral surface 41, at the base of the flange 37 with the lower face of the foot 43 here forming part of the lower surface 39 of the flange 37.

The upper face of the foot 43 forms a bearing face 45 provided to receive one of the zones of the freezing rack 4 located at the junction of the bottom wall 6 and of one of the toothed walls 11, 25, here the toothed wall 24, as can be seen in FIGS. 6 to 8.

In the direction of the height, the bearing face 44 of each foot 42 is further away from the plate 31 than the bearing face 45 of each foot 43. Thus, when it is installed on the support member 30, the freezing rack 4 is inclined.

This inclination is such (see FIGS. 7 and 8) that the longitudinal wall 13 is at the same level as the upper surface of the plate 31 whereas the longitudinal wall 12 is below the upper surface of the plate 31.

A cut-out 46 is provided in each flange 37 set back from the lateral surface 40.

The cut-out 46 is delimited by a bearing face that extends onwards from the bearing face 44 of the foot 42, a back face 47 and an upper face 48. For each flange 37, the upper face 48 faces opposite the bearing face 44 and the back face is transverse to the bearing face 44 and to the upper face 48.

Each cut-out 46 is configured to accommodate one of the longitudinal sections 9 or 10 (section 9 in FIGS. 5 to 9) and the toothed wall 11 or 25 (the toothed wall 11 in FIGS. 5 to 9).

The depth of the cut-out 46 is predetermined and here corresponds to the distance between the toothed wall 11 and the longitudinal wall 12 as well as to the distance between the toothed wall 25 and the longitudinal wall 13 (here the distances between the toothed walls 11, 25 and respectively the longitudinal walls 12, 13 are equal).

In the relative position of putting the straws 1 in place on the plate 31 shown in FIGS. 6 and 7, the freezing rack 4 is received on the support member 30 with the toothed wall 11 engaging against the back face 47 of the cut-out 46.

In this position, in the transverse direction (direction of the width) of the plate 31, the longitudinal wall 13 is at a distance from the plate 31 while the longitudinal wall 12 is close but as it is located below the upper surface of the plate 31, it does not hinder the access to that upper surface, which is more generally easy to access since the lateral wall 13 is at a distance from the plate 31.

The user can then easily spread the plurality of straws 1 over the fluted upper surface 53 of the plate 31, while taking care to center the straws roughly relative to the plate 31.

It will be noted that in the relative position of putting in place the straws 1 on the plate 31 shown in FIGS. 6 and 7, the distance between the lateral surface 41 and the toothed wall 25 is greater than the depth of the cut-out 46.

Figure 9:
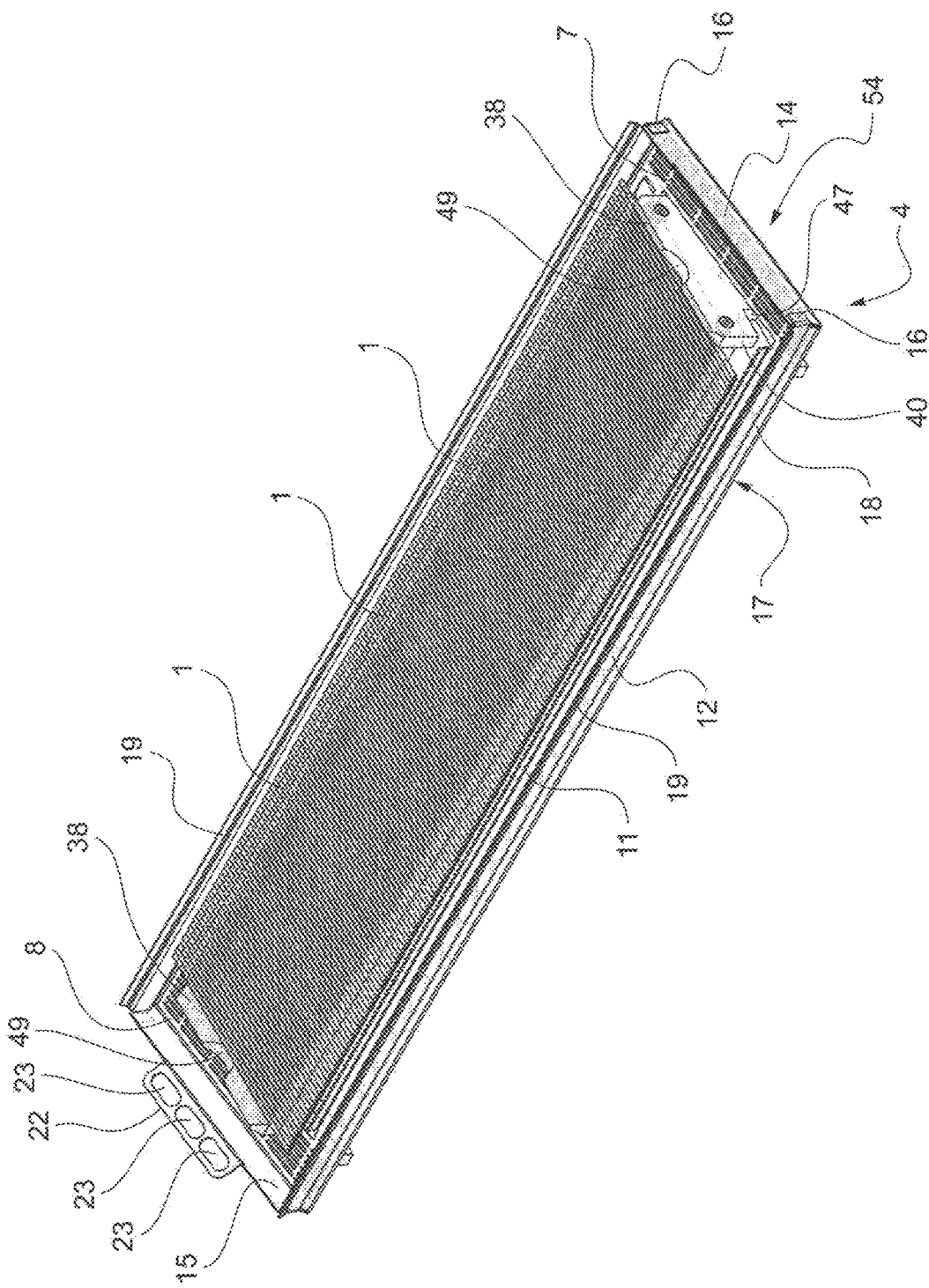
FIG. 9 is a perspective view of the support member of the freezing rack and of the straws in the position of FIG. 8.

Therefore, if the freezing rack 4 is slid over the bearing faces 44 and 45 in the direction which makes the toothed wall 11 come out of the cut-out 46 (towards the left in FIG. 7), the toothed wall 11 is out of the cut-out 46 when the toothed wall 25 comes to bear against the lateral surface 41, as is shown in FIGS. 8 and 9.

A position of longitudinal alignment of the straws has thus been entered, by them coming into contact against the longitudinal wall 13.

For some of the straws, this alignment is made at the time of the movement of the freezing rack 4 from the relative position of putting in place of the straws, since at the time of this movement the longitudinal wall 13 has come in contact with the straws which jut too much on its side then has remained in contact with them while pushing them. For the other straws (those which jut too far on the on the opposite side from the longitudinal wall 13), the user pushes them by hand so that they also come against the wall 13. All the straws are then aligned, since they each have one end along the wall 13, as can clearly be seen in FIG. 9.

The toothed wall 11, which is outside the cut-out 46, faces opposite the end sections 26 of the straws 1 while the toothed wall 25 faces opposite their end sections 27.

More specifically, the freezing rack 4 and the support member 30 are configured, in particular on account of the pitch of the set of toothing 29 of the walls 11 and 25 being the same as the pitch of the fluted surface 53 of the support member 30, such that each hollow 51 of the set of toothing 29 of the toothed wall 11 faces opposite the end section 26 of a straw 1 and such that each hollow 51 of the set of toothing 29 of the toothed wall 25 faces opposite the end section 27 of a straw 1.

Figure 10:
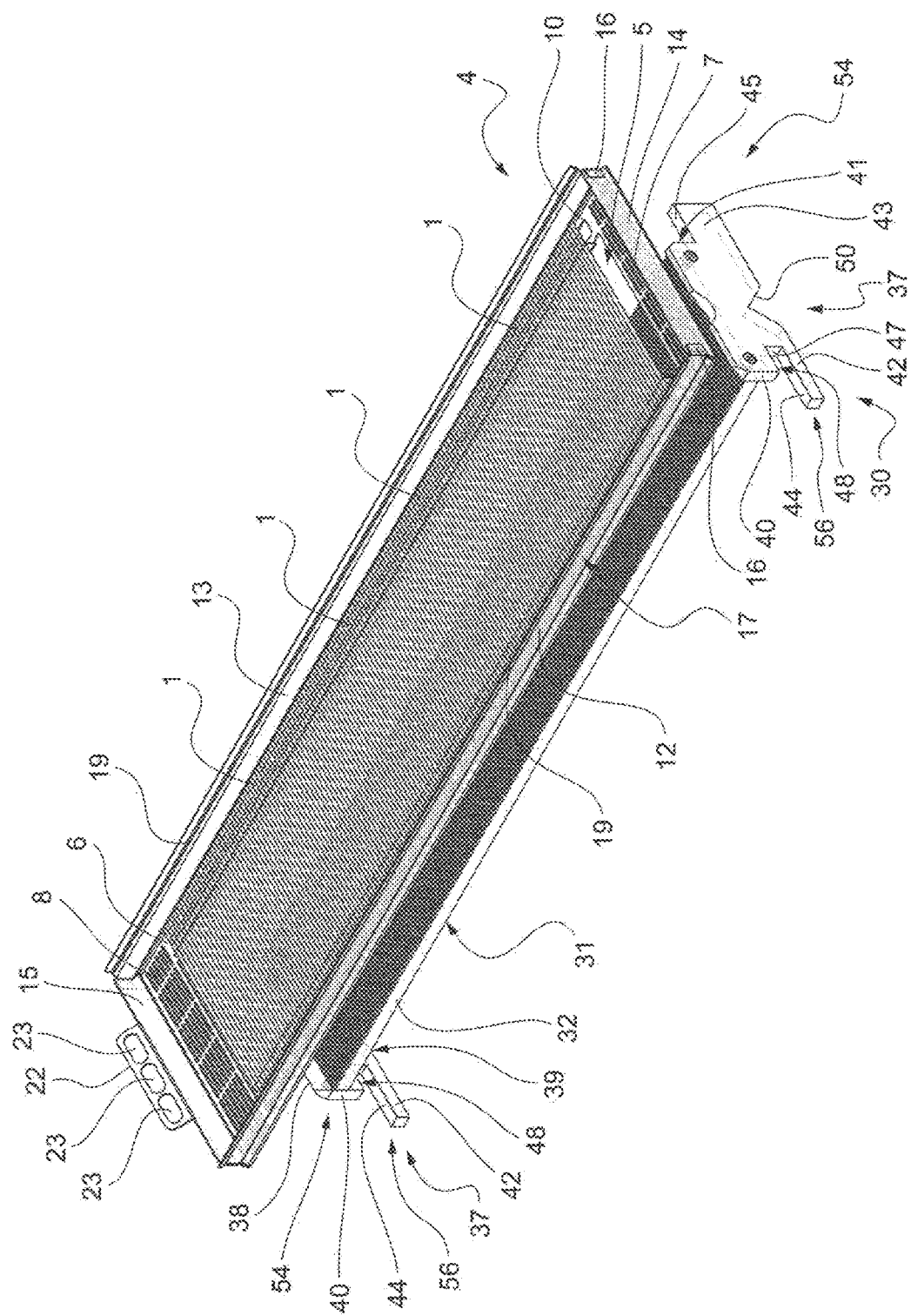
FIG. 10 is a similar view to FIG. 9 but with the straws put in place on the freezing rack, the transfer of the straws between the support member and the freezing rack having been carried out by raising the freezing rack from the position shown in FIGS. 8 and 9.

Thus, it suffices for the user to raise the freezing rack 4 for each end section 26, 27 of the straws to come to be accommodated in a hollow 51 of the set of toothing 29 of the toothed walls 11, 25, the straws 1 thus being put in place on the freezing rack 4, as can be seen in FIG. 10.

FIG. 10 shows a portion of toothed wall 11, 25 before raising the rack 4, when the straws 1 are disposed on the plate 31 and FIG. 11 shows this same portion of toothed wall 11, 25 after raising the rack 4, when the straws 1 are put in place in the set of toothing 29.

It will be noted that to simplify the drawings, only one of the grasping feet 22 of the rack 4 is illustrated in FIGS. 9 and 10.

It will be noted that each flange 37 here comprises cavity 49 provided in the upper surface 38 reaching to the plate 31. Each of these cavities 49 has a length and width making it possible to insert therein the finger of an adult hand.

Each cavity 49, disposed midway between the longitudinal faces 32, 33 of the plate 31, facilitates the spreading of the plurality of straws 1 on the fluted surface 53 of the plate 31 since it enables the user to place his or her finger there when depositing the plurality of straws into the plurality of channels 36 of the plate 31 in the neighborhood of each flange 37.

Each of the flanges 37 also comprises a cavity 50 provided in the lower surface 39 midway between each of the longitudinal faces 32, 33, of the plate 31. Each cavity 50 has a length and width making it possible to insert therein the finger of an adult hand.

The user can transport the support member by pinching the flanges 37, by placing a finger in each cavity 49 and another finger in each cavity 50.

The actions made by the user to put the straws 1 in place on the freezing rack 4 will now be gone over.

First of all, the freezing rack 4 is disposed on the support member 30.

More specifically, the plate 31 and the central part of each of the flanges 37 are inserted into the central free space 5 of the freezing rack 4, with the support member 30 and the freezing rack 4 disposed in the position for putting in place the straws 1 on the plate 31 (FIGS. 6 and 7).

Next, the user places the plurality of straws in disorder on the fluted surface 53 of the plate 31. By spreading them over the surface, each straw 1 becomes inserted in a channel 36 of the plate 31, the using taking care to roughly center the straws 1 relative to the plate 31.

Once the straws 1 have been placed into the channels 36, the user imparts translational movement to the rack 4 to place it in position of longitudinal alignment of the straws (FIGS. 8 and 9).

The user then takes hold of the grasping feet 22 to raise the freezing rack 4. The straws are then put in place on the freezing rack 4 (FIG. 10).

It will be noted that in FIGS. 6 to 10 it is the toothed wall 11 which is on the same side as the cut-out 46 but that it could have been the toothed wall 25, the part of the freezing rack 4 located on one side of a vertically oriented longitudinal median plane being the mirror image of the part located on the other side.

A description will now be given of an accessory to facilitate the transfer of the straws 1 from the freezing rack 4 towards a cup 55, this being a transfer device 60 shown in FIG. 13.

The transfer device 60 comprises a body 61.

The body 61 has the general shape of an inverted gutter. It is delimited by an inside face 84 and an outside face 85 and can comprise two edge surfaces 62, 63, a first end portion 64 and a second end portion 65.

The edge surfaces 62, 63 extend longitudinally from the first end portion 64 to the second end portion 65.

Each end portion 64, 65 comprises two bases 66 of wedge shape 66.

The wedges 66 of each end portion 64, 65 form a lateral skid 67.

The lateral skids 67 are configured to bear on the gutter portion 19. This gutter portion 19 is formed by the wing 20 and the inclined wing 21.

The length of the body 61 of the transfer device 60 corresponds to the distance between the gutter portions 19 of each of the longitudinal walls 12, 13 of the freezing rack 4.

The width of the body 61, that is to say the spacing between each of the edge surfaces 62, 63 corresponds to the width of the transverse sections 7, 8 of the rack 4, i.e. the distance between the transverse wall 14 (and respectively 15) and one of the ends of the toothed walls 11 and 25. The body 61 is configured to receive all the straws disposed on the rack 4, i.e. between seventy and two hundred and five straws (one hundred and seventy-five straws in the example illustrated).

The transfer device 60 further comprises a collector 70.

The collector 70 is disposed between the two lateral skids 67 and comprises a scoop 72.

The scoop 72 projects from a base of the body 61 in a way that curves towards the edge surface 63. The scoop 72 comprises an inside surface 81 disposed facing the inside face 84 of the body 61.

The scoop 72 is configured to be accommodated in the central free space 5 of the freezing rack 4.

The collector 70 delimits an accommodation 71. More particularly, the accommodation 71 is of round cross-section and is delimited by the inside face 84 of the body 61 and by the inside surface 81 of the scoop 72.

The housing 71 is open over the whole of its length by a mouth 78.

The mouth 78 is configured to enable the insertion of the straws 1 into the accommodation 71. The length of the mouth 78 is thus greater than the length of the straws 1, i.e. more than 133 mm.

More particularly, the mouth 78 is located between a distal end 86 of the scoop 72 and the edge surface 63 of the body 61.

The transfer device 60 of the straws 1 further comprises non-return members 73. Here, two non-return members 73 extend in a way that curves in the mouth 78 from the edge surface 63 towards the inside surface 81.

The non-return members 73 are configured to let the straws 1 enter the accommodation 71 through the mouth 78 and to prevent the straws 1 from coming out from the accommodation 71 through the mouth 78.

The non-return members 73 are blades of which the free end portion 80 is able to bear on the internal surface 81 of the scoop 72.

These blades each have an outside surface 82 and an inside surface 83. The outside surface 82 is configured to be in contact with the straws disposed on the toothed walls 11, 25 of the rack 4, whereas the inside surface 83 is configured to be in contact with the collected straws, disposed in the collector 70.

The blades forming the non-return members 73 are of a flexible material enabling the bending of these blades in contact with the straws 1 disposed on the rack 4. Here, for a thickness of the order of 0.4 mm, the blades have a hardness of the order of 95 shore A.

When the straws 1 enter into contact with their outside surface 82, the non-return members 73 bend, such that their free end portion 80 rises from the scoop 72, thus creating a space between the scoop 72 and the non-return members 73 enabling the passage of the straws 1 into the accommodation 71.

After the passage of a straw 1, the blade returns into contact with the surface 81, preventing the exit of the straws from the accommodation 71.

The transfer device 60 is provided with a flange 74.

The flange 74 is of round general shape and extends from the end portion 65, transversely to the body 61.

The flange 74 is formed by a bottom 76 and a border 75 extending along the periphery of the bottom 76. The flange 74 is coaxial to the accommodation 71.

The flange 74 closes the accommodation 71 at one end, here the end in the neighborhood of the end portion 65, the accommodation 71 being open at the other end.

A cut-out 77 is provided in the body 61, between the border 75 of the flange 74 and the end portion 65. The cut-out 77 is configured to accommodate the inclined wing 21 of the gutter portion 19. Thus, when the transfer device 60 is disposed on the freezing rack 4, the cut-out 77 accommodates the inclined wing 21 and the flange 74 is disposed externally to the first longitudinal wall 12.

The transfer device 60 for straws 1 is provided with a handle 79 projecting from the body 61. The handle 79 enables the user to manipulate the transfer device 60. It is disposed equidistant from the end portions 64, 65 and from the edge surfaces 62, 63 and extends upward and outward from the freezing rack 4, when the transfer device 60 is placed in position on the rack 4.

Figure 14:
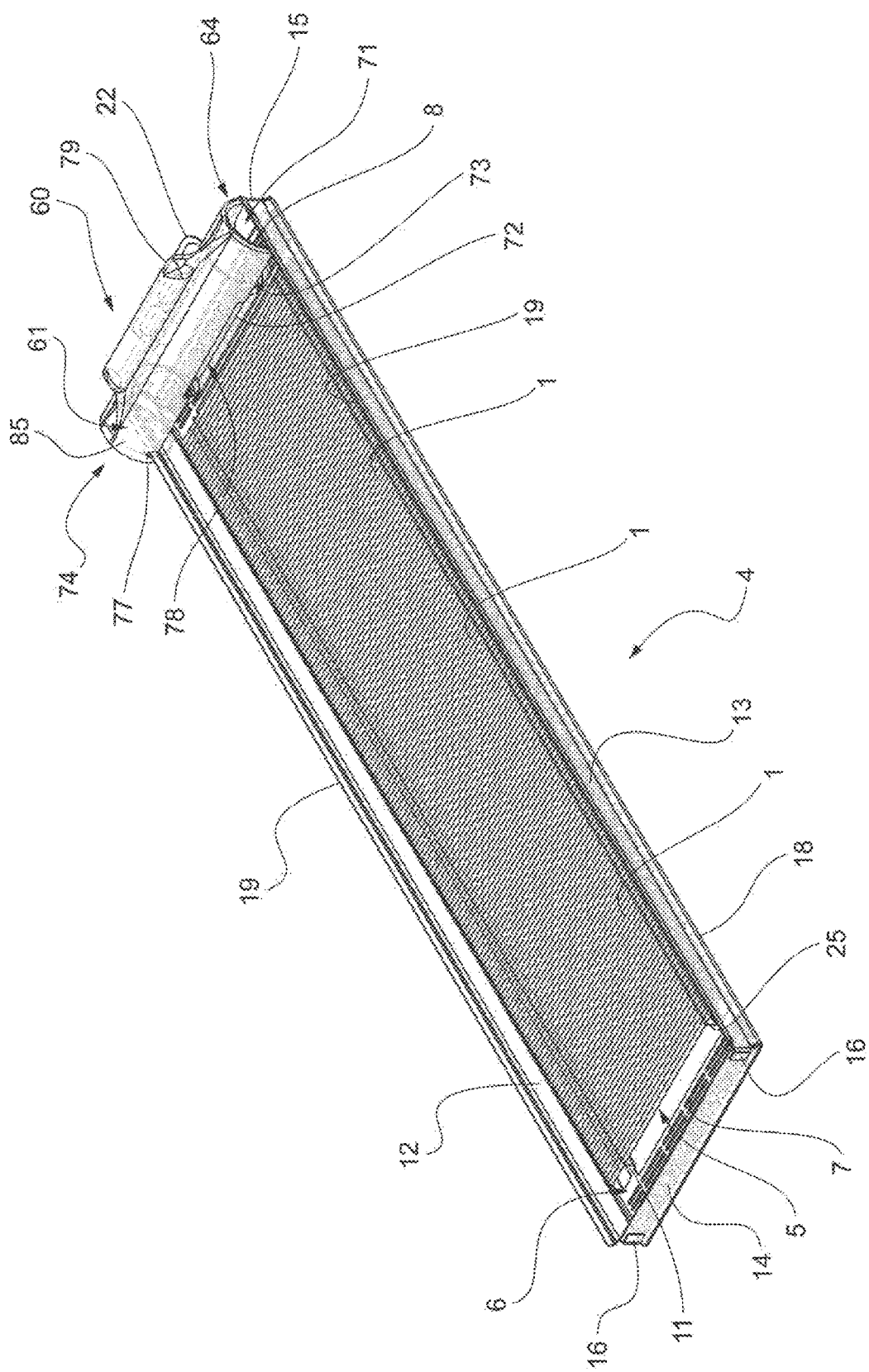
FIG. 14 is a perspective view of the transfer device and of the freezing rack on which are disposed the straws, the transfer device being in a first extreme position.

The rack 4 and the transfer device 60 are configured to have a first extreme position of the transfer device 60 for transferring the straws 1 on the freezing rack 4 shown in FIGS. 14 to 16.

In the first extreme position, the transfer device 60 is received by the freezing rack 4 with each lateral skid 67 bearing on a gutter portion 19 of the rack 4 (FIG. 15) and the surface forming the lower limit of the mouth 78 is at a level located between the transverse sections 7, 8 and the bottom of the hollow 51 of the toothed walls 11, 25 (FIG. 16).

In this position, the collector 70 is located over one of the transverse sections 7, 8, here the second transverse section 8. The body 61 bears against the transverse wall 14, 15 corresponding to the transverse section, here the wall 15, such that the mouth 78 is oriented towards the toothed walls 11, 25 and thus towards the straws 1.

By sliding the transfer device 60 slide over the freezing rack 4, the skids 67 slide within the gutter portions 19, the non-return members 73 disposed between the toothed walls 11, 25 will enter into contact with the straws 1 put in place in the hollows 51 of the toothed walls 11, 25.

As illustrated in FIG. 17, in contact with the straws 1, the non-return members 73 bend towards the inside of the accommodation 71, leaving a space between the scoop 72 and the free end portion 80 of the non-return members 73. The straws 1 then become inserted into that space and enter into contact with the scoop 72. The straws 1 still disposed within the space push the straws 1 already in the accommodation 71 and the curved shape of the scoop 72 enables them to be guided towards the center of the accommodation 71. This curved form thus enables proper flow of the straws 1 into the accommodation 71 and efficient insertion of the straws 1. Once in the accommodation 71, the straws 1 cannot come out again since the mouth 78 through which they have passed to enter therein is closed off by the non-return members 73. This closing off is made possible by the shape of the non-return members 73 curved towards the accommodation 71 and by their free end portion 80 bearing on the inside surface 81 of the scoop 72 when these members are acted upon outwardly.

At end of travel, all the straws 1 disposed on the rack 4 have been transferred into the accommodation 71, the rack 4 and the transfer device 60 being in a second extreme position.

Figure 19:
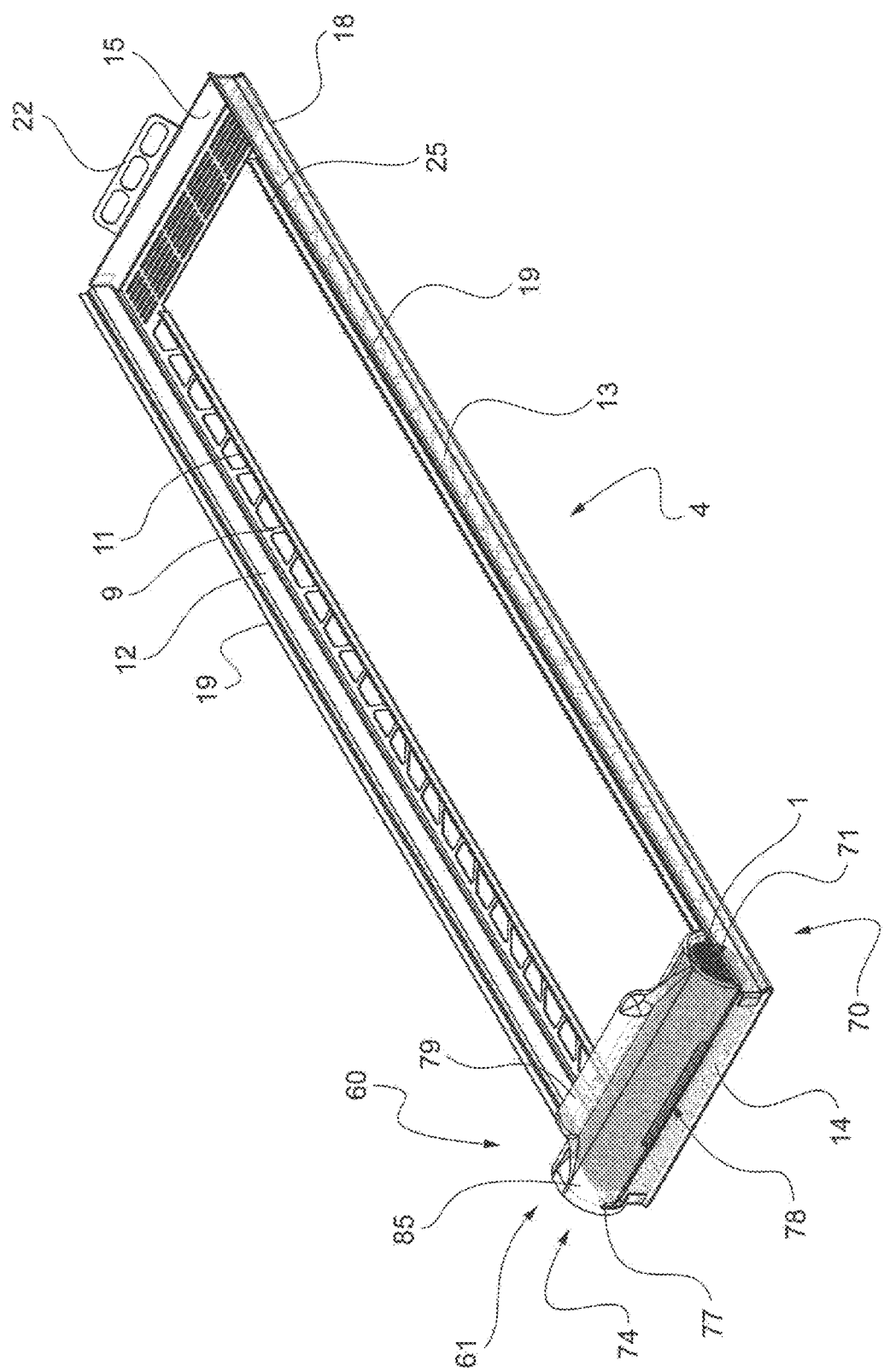
FIG. 19 is a perspective view of the transfer device and of the freezing rack in the same position as in FIG. 18.

The second extreme position is illustrated in FIGS. 18 and 19.

In this position, the skids 67 still bear on the gutter portions 19, while the collector 70 is located over the opposite transverse section to that of the first extreme position, here the section 7. The body 61 bears against a transverse wall 14, 15, here the wall 14, such that the mouth 78 is oriented towards that wall 14.

Thus, it suffices for the user to raise the transfer device 60 by the handle 79 to remove it from the rack 4.

The transfer device 60 for transfer of the straws 1 is provided then to cooperate with the cup 55 (FIGS. 20 and 21).

The cup 55 is disposed on a horizontal support and has a cross-section in which comes to be accommodated the cross-section of the accommodation 71 of the transfer device 60.

The transfer device 60, after having been raised from the freezing rack 4, is brought towards the cup 55, for example as shown in FIG. 20.

It can be seen that, thanks to the flange 74, it is not necessary to keep the transfer device 60 in a horizontal position to avoid the straws 1 coming out therefrom, provided the flange 74 is in the lowest position, the straws 1 having one of their ends bearing against the bottom 76 of the flange 74. The body 61, the scoop 72 and the non-return members 73 then enable the straws 1 to be kept within the accommodation 71.

The transfer device 60 is subsequently tipped over above the cup 55 with the opposite side to the base 74 downward. The straws 1 then slide from the accommodation 71 and fall inside the cup 55 (FIG. 21).

The actions carried out by the user to transfer the straws from the freezing rack 4 to the cup 55. will now be gone over.

First of all, the transfer device 60 is disposed on the freezing rack 4 where the straws 1 are disposed, in the first extreme position.

More specifically, the lateral skids 67 are disposed against the gutter portions 19 and the collector 70 inserts between the longitudinal walls 12, 13 of the rack 4, located over a transverse section 7, 8, the mouth 78 disposed towards the straws 1.

The user next imparts translational movement to the transfer device 60 over the rack 4 by sliding along the gutter portions 19, through taking hold of the handle 79. The straws 1 then become inserted into the collector 70 of the transfer device 60.

At end of travel, when the body 61 enters into stopped engagement against a transverse wall 14, 15, the mouth 78 towards that transverse wall 14, 15, all the straws from the rack 4 have been transferred into the transfer device 60. The user raises the transfer device 60 by the handle and tips it through a quarter rotation such that the bottom flange 74 supports the straws 1.

The user turns over the transfer device 60 above the cup 55 to transfer the straws into the cup 55. Once the straws are in the cup 55, they can be placed into a bath of liquid nitrogen.

In the illustrated example, the transfer device 60 has slid from the first transverse section 8 towards the transverse section 7 but naturally it is possible to operate in the opposite direction, that is to say from the first transverse section 7 towards the second transverse section 8.

In variants not illustrated, the forms of the transfer device are different, for example the skids are implemented differently than by the wedges 66, for example by fingers.

Numerous other variants are possible according to circumstances, and in this connection, it is to be noted that the invention is not limited to the examples described and shown.

The invention claimed is:

1. An assembly for manipulating a plurality of straws for packaging animal semen, each of said plurality of straws having a predetermined diameter and a predetermined length, comprising a freezing rack having a rim and a bottom surrounding a central free space, said bottom comprising two toothed walls which extend longitudinally along said central space, each toothed wall having an apex and a set of toothing at said apex, the sets of toothing of said toothed walls comprising a succession of teeth and hollows, each tooth of said toothed walls being identical with each hollow delimited by a surface having a curvature according to said predetermined diameter; wherein in said freezing rack said bottom comprises a bottom wall in the form of a rectangular frame surrounding the central free space, the bottom wall comprising two transverse sections and two longitudinal sections, said toothed walls extending transversely to the bottom wall and internally bordering said longitudinal sections, said rim extending transversely to the bottom wall and comprising two longitudinal walls externally bordering said longitudinal sections of the bottom wall and two transverse walls externally bordering said transverse sections of the bottom wall, said longitudinal walls each comprising an apex and a gutter portion at said apex of each of said longitudinal walls;

said assembly further comprises a transfer device for said plurality of straws comprising two lateral skids and a collector for said plurality of straws that is disposed between the two lateral skids, said freezing rack and said transfer device being configured to have a first extreme position in which said transfer device is disposed with each lateral skid bearing on a said gutter portion while said collector is located over a first of said two transverse sections of said bottom wall, to have a second extreme position in which said transfer device is disposed with each lateral skid bearing on a said gutter portion while said collector is located over a second of said two transverse sections of said bottom wall, and such that by sliding the transfer device from the first extreme position to the second extreme position with said skids sliding on said gutter portions, said plurality of straws initially disposed on said rack is collected in said collector of said transfer device.

2. The assembly according to claim 1, wherein said collector has a length and delimits an accommodation opening over an entirety of said length by a mouth, which mouth is oriented towards said toothed walls in said first extreme position, said freezing rack and said transfer device are configured such that when the transfer device is disposed with each lateral skid bearing on a said gutter portion, the surface forming the lower limit of the mouth is at a level located between said transverse sections of the bottom wall and the bottom of the hollow of the toothed walls.

3. The assembly according to claim 2, wherein said accommodation is of round cross-section.

4. The assembly according to claim 3, wherein the transfer device comprises a body of inverted channel shape and a curved scoop projecting from a base of said body, said mouth being located between a distal end of the scoop and a longitudinal edge surface of the body.

5. The assembly according to claim 1, wherein the transfer device for said plurality of straws comprises a body of inverted channel shape having two end portions located longitudinally on opposite sides of said collector, each said end portion having two bases of wedge shape, each said skid being formed by said two bases of wedge shape of a respective one of said end portions.

6. The assembly according to claim 1, wherein each gutter portion comprises a wing extending transversely to the longitudinal walls and an inclined wing extending from said wing outwardly and towards a top of said freezing rack.

7. The assembly according to claim 1, wherein said collector has a length and delimits an accommodation opening over a whole of said length by a mouth, which said mouth is oriented towards said toothed walls in said first extreme position; and the transfer device comprises non-return members disposed in said mouth, which are configured to let the straws enter the accommodation through said mouth and to prevent the straws from coming out therefrom through said mouth.

8. The assembly according to claim 7, wherein said non-return members are blades configured to bend in order to allow the straws to enter the accommodation through said mouth and to come into stopped engagement against a wall to prevent the straws coming out therefrom through said mouth.

9. The assembly according to claim 1 wherein said collector has a length and delimits an accommodation opening over a whole of said length by a mouth, which said mouth is oriented towards said toothed walls in said first extreme position; the transfer device comprises a flange closing said accommodation at one end of said transfer device, said accommodation being open at the other end of the transfer device.

10. The assembly according to claim 1, wherein said assembly further comprises a cup for storing the straws, said collector of the transfer device delimiting an accommodation of round section open at one end of the transfer device, said cup having an opening having a section in which is accommodated the section of said accommodation.

* * * * *